United States Patent [19]

Warehime

[11] Patent Number: 5,094,368
[45] Date of Patent: Mar. 10, 1992

[54] PRESSURE-DRIVEN SEAL FOR CYLINDRICAL VALVE SOAP DISPENSER AND SOAP DISPENSER HAVING PRESSURE-DRIVEN SEAL

[76] Inventor: Donald E. Warehime, 838 East Buttonwood Dr., Brea, Calif. 92621

[21] Appl. No.: 558,165

[22] Filed: Jul. 24, 1990

[51] Int. Cl.⁵ .................................................. B05B 7/00
[52] U.S. Cl. ....................... 222/630; 220/304; 277/27; 277/177
[58] Field of Search ............ 277/27, 173, 177; 220/304

[56] References Cited

U.S. PATENT DOCUMENTS

| | | | |
|---|---|---|---|
| 2,016,223 | 10/1935 | Bowers | 220/46 |
| 2,016,226 | 10/1935 | Clausen | 220/46 |
| 2,126,505 | 8/1938 | Risser | 285/129 |
| 2,157,983 | 5/1939 | Glougie | 220/46 |
| 2,352,192 | 6/1944 | Gasche | 220/61 |
| 2,553,222 | 5/1951 | Wallgren et al. | 123/193 |
| 2,614,793 | 10/1952 | Storm | 285/106 X |
| 2,707,118 | 4/1955 | Swartz et al. | 277/27 |
| 2,732,268 | 1/1956 | Duval | 277/79 X |
| 2,967,744 | 1/1961 | Davies | 220/240 |
| 3,289,879 | 12/1966 | Williams | 220/378 |
| 4,083,133 | 4/1978 | Ravesteyn et al. | 37/72 |
| 4,519,636 | 5/1985 | Tomlin et al. | 285/95 |
| 4,577,870 | 3/1986 | Scott et al. | 277/27 X |
| 4,703,937 | 11/1957 | Chrzanowski | 277/177 X |
| 4,785,850 | 11/1988 | Sanchez | 239/317 X |

FOREIGN PATENT DOCUMENTS 1314168  5/1987  U.S.S.R. .................. 277/27

Primary Examiner—Michael S. Huppert
Assistant Examiner—Joseph A. Kaufman
Attorney, Agent, or Firm—Christie, Parker & Hale

[57] ABSTRACT

A flexible gasket in a groove is used to seal a body carrying the groove against a second body facing the open side of the groove. Slots are cut in the wall of the groove facing the high pressure side of the seal to allow the high pressure fluid to push the gasket against the second body and the opposite wall of the groove. The gasket has a cross section slightly larger than the groove so that portions of the gasket extend into the slots to hold the gasket in the groove.

29 Claims, 3 Drawing Sheets

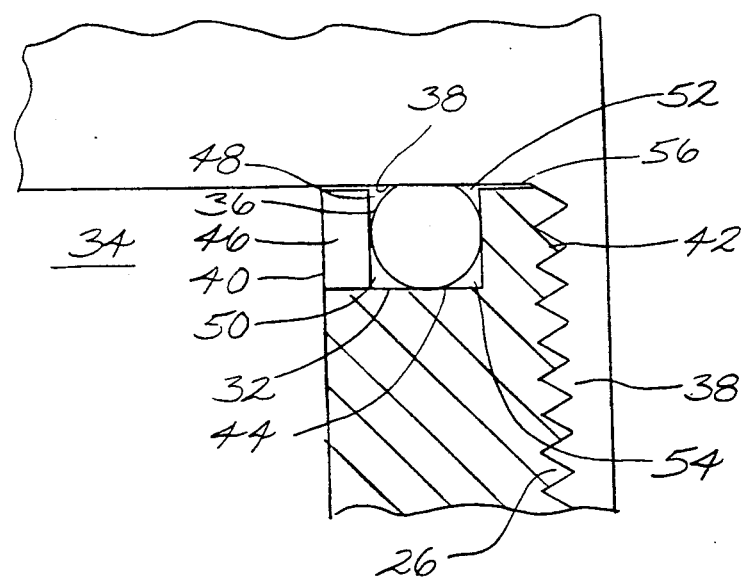
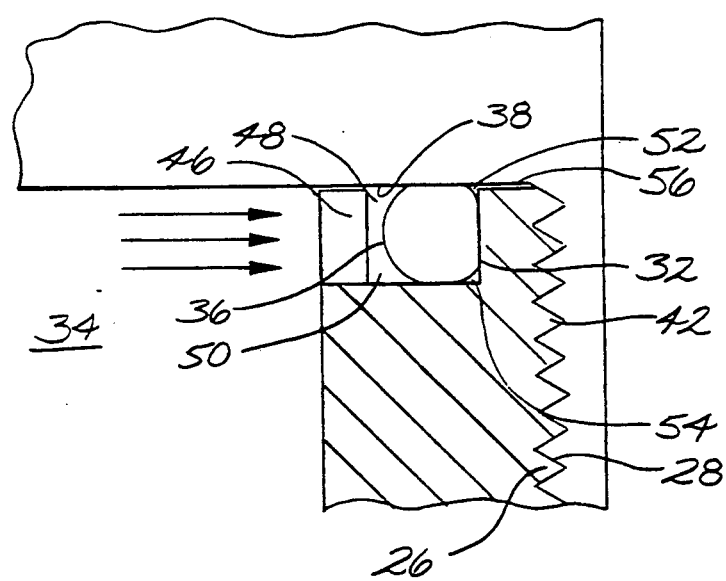

PRESSURE-DRIVEN SEAL FOR CYLINDRICAL VALVE SOAP DISPENSER AND SOAP DISPENSER HAVING PRESSURE-DRIVEN SEAL

FIELD OF THE INVENTION

The present invention relates to the field of dispensers having sealed connections and, in particular, to the field of pressure-holding containers in which the pressure within the container is used to ensure the seal between the container and the rest of the dispenser.

BACKGROUND OF THE INVENTION

Flexible, deformable seals are well known for use in a variety of sealing arrangements, one example of which is shown in U.S. Pat. No. 4,785,850 to Sanchez, the disclosure of which is fully incorporated herein by reference. As best seen in FIG. 1 of that patent, an O-ring gasket 36 rests in a groove which surrounds the outside of a soap cup 20. The soap cup can be screwed into a valve body and is sealed against that body when the gasket is pressed against a flat surface of the valve body. Water and soap under pressure within the soap cup are contained in the soap cup by the deformed O-ring gasket pushing against the soap cup and the valve body's flat surface. In this arrangement, the soap cup can be easily installed or removed, and the O-ring gasket is held in place because it must be stretched slightly to fit around the outside circumference of the soap cup.

Unfortunately, the arrangement is also prone to leaks. Fluid within the soap cup is pushed out towards the O-ring and to the contact area between the gasket and the valve body's flat surface. Unless the gasket is already tightly pressed against the flat surface, the fluid pressure is enough to press the gasket away and create an opening between the gasket and the valve body's flat surface, allowing the fluid to leak out. To completely ensure against leaks, the soap cup must be screwed down very tightly, which is inconvenient to do by hand. In addition, the soap cup's groove stores pressure below the gasket. Even when the fluid pressure in the soap cup is released, the fluid trapped in the groove will continue to push the gasket against the valve body making the soap cup difficult to remove. Finally, the gasket will often stretch over time and fail to hug the outside circumference tightly enough to stay in place when the soap cup is removed.

Another know sealing arrangement is shown in U.S. Pat. No. 2,157,983 to Glougie. In this patent, a chamber is closed by a platen and sealed by an O-ring mounted in the chamber walls. Passages through the walls of the chamber conduct pressurized fluid within the chamber to the underside of the the seal to push the seal up against the platen. This arrangement reduces the leakage problem above, but the passages shown are difficult and expensive to produce, especially in a thin walled chamber and especially with high speed plastic injection molding. In addition, the O-ring seal as shown in FIG. 3 of Glougie must have a peculiar shape and be very closely matched to the recess in the chamber wall in which the O-ring sits.

SUMMARY OF THE INVENTION

The present invention provides a sure positive seal between two parts, regardless of the pressure of the fluid being sealed and without requiring an inordinate amount of force to push the two parts together. The parts are both easy to assemble and easy to disassemble. When applied to an O-ring arrangement, it also provides a structure for holding the O-ring in place when the two parts are disconnected. This is all accomplished without any increase in the number of parts and without complex bores or passages which are expensive to manufacture.

In one embodiment of the invention, a fluid sealing connection is provided with a first body that has a sealing surface and a second body with a groove. The second body is connectable to the first body at a juncture so that the groove faces the sealing surface. The groove has a high pressure side wall and an opposite low pressure side wall. A flexible, deformable gasket fits within the groove, and slots from the high pressure side wall allow high pressure fluid to enter the groove and press the gasket against the juncture between the two bodies to seal the first and second body connection.

The slots preferably extend the entire depth of the groove and are at least as deep as one half the thickness of the gasket. Preferably, the groove surrounds a reservoir for containing fluid under pressure and the high pressure wall is adjacent the reservoir. The gasket is preferably annular with a diameter larger than the width of the groove so that it is deformed to a non-annular shape when at rest in the grove. The slots are adapted to receive a portion of the gasket so that, when the gasket is at rest, portions of the gasket extend into the slots and are held in place there. The first and second bodies preferably have mating threads and are connectable to each other thereby.

The invention also encompasses a fluid dispenser with a soap reservoir that has an opening. First and second bodies are connectable together to close the soap reservoir opening. One body has a groove spaced apart from and surrounding the opening, and the other body has a sealing surface which faces the groove when the bodies are connected. The groove has a high pressure side wall nearest the opening and a low pressure side wall opposite the high pressure side wall. There is a flexible, deformable gasket in the groove. An upstream passage conducts fluid at high pressure into the soap reservoir and a downstream passage conducts fluid out of the soap reservoir. Slots in the high pressure side wall allow high pressure fluid in the soap reservoir to enter the groove and press the gasket against the low pressure side wall and the sealing surface to seal the closure of the soap reservoir opening. The first and second bodies are preferably connectable with mating threads, and the groove is preferably annular. The gasket is also annular, and the cross sectional width of the gasket is larger than the width of the groove. The slots are preferably spaced equidistant about the groove's circumference.

BRIEF DESCRIPTION OF THE DRAWINGS

FIG. 3 is a cross sectional view taken along line 3—3 of FIG. 2 showing the gasket at rest;

FIG. 4 is a cross sectional view taken along line 4—4 of FIG. 3 showing the gasket when pressure is applied against the gasket through the slots.

DETAILED DESCRIPTION OF THE INVENTION

Figure 1:
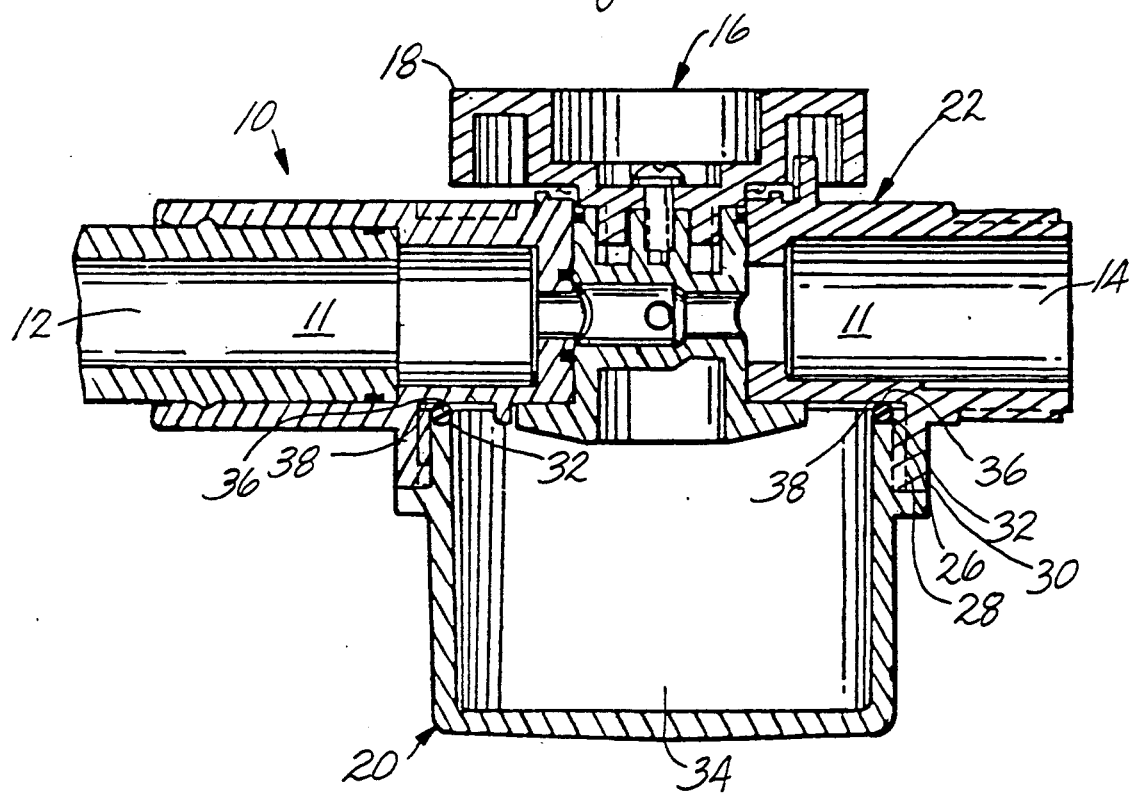
FIG. 1 is a cross sectional view of a soap dispenser incorporating one embodiment of the present invention.

The present invention can be applied to a variety of different articles in which a seal between two mating parts is desired. In the embodiment shown in FIG. 1, it is adapted for use with a soap dispenser 10. The soap dispenser has a main passageway 11 with an upstream conduit 12 and a downstream conduit 14. Normal fluid flow is from the upstream conduit through a valve body 16 and out the downstream conduit 14. The valve body is designed so that by rotating a control knob 18, a portion of the fluid being driven into the upstream conduit 12, is directed into a soap reservoir 20. There the fluid is mixed with soap and comes back out of the soap reservoir through the valve and the downstream conduit 14. The fluid is conducted into and out of the soap reservoir by smaller tubes (not shown). These tubes form a part of the upstream and downstream conduits respectively, and allow pressure in the soap reservoir to be relieved even when the upstream conduit no longer conducts fluid into the soap reservoir.

The soap dispenser 10 is constructed from a main housing 22. The upstream conduit 12 is inserted into the housing to form the upstream portion of the passageway and the soap reservoir is screwed into the bottom of the housing. The soap reservoir has male threads 26 which mate with matching female threads 28 on the main housing. The soap reservoir is installed and removed using these threads. Further details concerning the operation and construction of the various passageways and the valve 16 are contained in U.S. Pat. No. 4,785,850 to Sanchez, the disclosure of which is hereby fully incorporated herein by reference. The embodiment of FIG. 1 of the present application differs from that shown in U.S. Pat. No. 4,785,850 in the sealing arrangement between the soap reservoir and the main housing.

In the present invention, the soap reservoir has a groove 32 in its top surface, i.e., at its upper edge. This groove completely surrounds the interior cavity 34 in which the soap is held and in which the fluid at pressure from the main passageway is circulated. A gasket 36 rests within the groove and seals the top surface of the soap reservoir against a preferably substantially flat mating surface 38 on the main housing 22.

Figure 2:
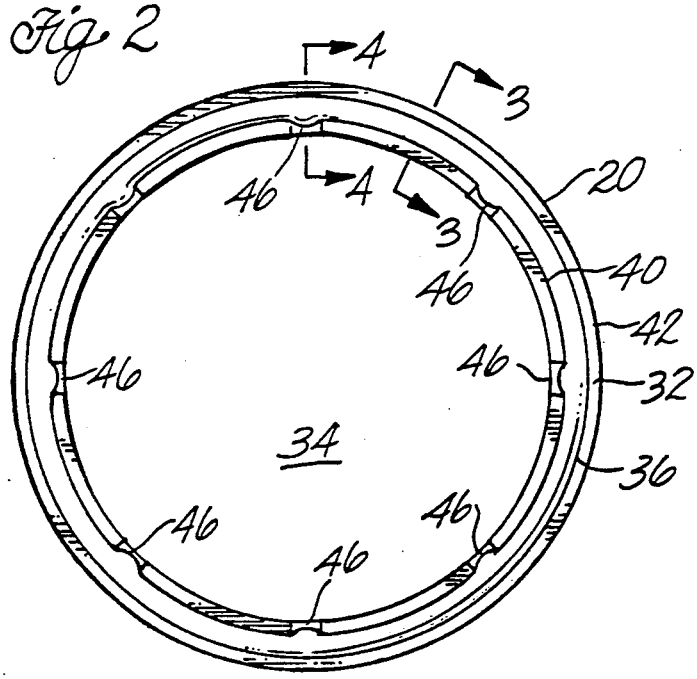
FIG. 2 is a top plan view of the soap cup of FIG. 1.

As better shown in FIG. 2, the soap reservoir 20 is preferably cylindrical so it can easily be screwed onto the main body. The groove 32 is circular, however, the groove may have a variety of other shapes instead. As shown in FIG. 3, the groove has a preferably rectangular cross section with a vertical high pressure side wall 40 closest to the interior cavity 34 and a vertical low pressure side wall 42 opposite the high pressure side wall. Between these walls is the groove bottom 44. The side walls extend towards the substantially flat surface 38 of the main housing or body 22 from the groove bottom. A conventional round O-ring gasket is retained in the groove formed by the walls. The gasket is preferably made of a material that is flexible and deformable under pressure. The soap reservoir and main housing are preferably made of a lightweight, inexpensive, molded plastic material.

When the soap dispenser is in use the upstream conduit is connected to a garden hose. This makes the water pressure inside the soap reservoir (typically 480–950 kPa) much greater than the air pressure outside the soap reservoir (typically 100 kPa) driving the water over the high pressure side wall of the groove and into the groove. From the groove, the water will try to escape from the soap reservoir over the gasket and the low pressure side wall through the space between the reservoir and the housing.

When the soap reservoir is screwed onto the main body, the gasket is forced up against the sealing surface by the pressure on the bottom 44 of the groove. The tighter the soap reservoir is screwed on, the more the gasket is pushed up against the sealing surface, and the tighter the seal. For fluid within the cavity to escape around the gasket, it must create a gap between the gasket and the sealing surface 38. In a conventional O-ring seal arrangement, the fluid pushes down against the top of the gasket and, when the inside pressure is high enough, it creates a small gap between the gasket and the sealing surface. The fluid then exits the high pressure side through the space 56 at the juncture of the sealed parts and leaks out through the threads 26, 28 holding the two parts together. The higher the pressure within the sealed container, the greater the force pushing the top of the gasket downward into the groove. This force can normally be overcome only by tightening the soap reservoir to increase the pressure with which the groove pushes the gasket up against the sealing surface 38.

When a conventional O-ring seal is applied to the soap dispenser of FIG. 1, and the upstream passageway is coupled to a conventional garden hose, the pressure from the cavity 34 against the O-ring gasket 36 is so great that the soap reservoir normally leaks when installed by hand. When the pitch of the threads is low enough to allow an average person to easily screw the soap dispenser onto the main body tightly enough to insure a good seal, the soap dispenser becomes tedious to remove and replace because of the large number of turns required to install and remove it.

To overcome the problem described above, a number of slots 46 are formed in the high pressure side wall 40 of the groove 32. As shown in FIG. 3, the slots preferably extend from the bottom 44 of the groove all the way up to the top of the groove. The slots are as deep as the groove. However, the slots can also be in the form of apertures near the groove bottom. As shown in FIG. 2, the groove is otherwise conventional, with a standard high pressure side wall 40 along much of its length. As explained in more detail below, the slots allow fluid in the interior cavity of the soap reservoir to push against, not just the very top of the gasket, but along one entire side of the gasket 36 as indicated by the arrows in FIGS. 4 and 5. As a result, the gasket is urged upwards as well as against the low pressure side wall 32, enhancing the gasket's seal against the sealing surface 38. The higher the fluid pressure in the interior cavity, the more firmly the gasket is pushed. If the slots create an opening as deep as or deeper than the gasket is thick, then the pressure on the gasket through the slots is evenly distributed ensuring a strong seal.

Another problem with a conventional O-ring seal is that there is nothing to hold the gasket in place. It is important, at least for most household products, that the parts not be easily lost. The gasket should be easily removed and replaced, but should stay in place once inserted there, even when the soap reservoir is tipped or shaken. This problem is solved in two ways by the present invention. The gasket's inside diameter at rest, i.e., when it is not deformed by anything other than atmospheric pressure, is somewhat less than the groove's inside diameter. When there is no fluid pressure in the interior cavity 34, as shown in FIGS. 2 and 3, the resilient gasket stretches to hug the high pressure side walls. This helps ensure that the gasket stays in the slot even when the soap reservoir is removed from the main housing 22.

In addition, in order to help retain the gasket in the groove, the gasket's circular cross section at rest is preferably slightly wider than the groove's so that the gasket must be deformed to fit into the groove. The gasket of FIG. 3 differs from a conventional O-ring gasket in that it contacts the groove on three surfaces, the two sides and the bottom. A conventional O-ring gasket will only touch two surfaces, usually the bottom and the outer or low pressure side wall. This gasket condition of having a wider cross section than the groove is commonly referred to as having too much O-ring. Normally, the excess O-ring material will be pushed upwards out of the groove and the gasket will have an undulating or wavy top surface. The undulating surface makes it even harder to adequately tighten the soap reservoir against the valve body. The undulation, however, will typically not occur when the slots are provided. Instead, a portion of the gasket extends into the slots when the gasket is sufficiently deformed allowing the gasket to lie flat and creating friction against the slot walls, as shown in FIG. 2. The friction of the excess gasket material against the slots combined with the friction of the slightly oversized gasket against the side walls also helps hold the gasket in the groove.

Figure 5:
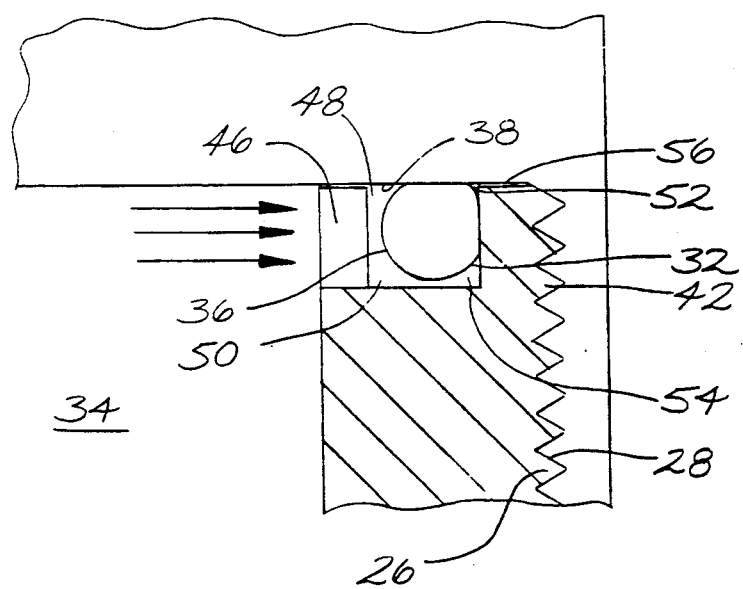
FIG. 5 is a cross sectional like that of FIG. 4 showing an alternate gasket shape under pressure.

The effect of the slots in insuring a fluid tight seal can best be seen in FIGS. 3-5. The gasket of FIG. 3 with too much O-ring contacts the three groove surfaces and the sealing surface at rest. This creates four distinct channels around the O-ring separated from each other by the O-ring gasket, an upper 48 and lower 50 high pressure side channel and an upper 52 and lower 54 low pressure side channel. The upper high pressure side channel is open to the soap reservoir through the top of the high pressure side wall below the valve body. The upper low pressure side channel 52 is open to the outside environment through the juncture 56 between the reservoir and the valve body and the threads 26. When the reservoir is coupled to the high pressure source, high pressure fluid rushes into the upper high pressure side channel just as in a conventional arrangement. However, because of the slots 46 high pressure fluid also rushes into the lower high pressure side channel. Since both channels are exposed to the same pressure, the pressure upwards and downwards on the gasket is balanced between the two channels 48, 50 on the high pressure side. The lower low pressure side channel 54 is sealed by the gasket so that as the gasket is pushed from the high pressure side it is forced upward into the upper low pressure side channel 52 where it seals off the juncture 56 between the parts.

Further increases in the pressure merely force the gasket closer to the juncture. They do not reduce the effectiveness of the seal. With extremely high pressure the gasket can be forced into the juncture and permanently deformed. Proper selection of gasket hardness and materials for the anticipated pressures avoids this problem. FIG. 4 shows the gasket pushed up into the upper low pressure side channel by the high pressure fluid.

With sufficient pressure, the gasket may be pushed far enough toward the upper low pressure channel 52 and the juncture 56 between the two parts that the seal between the two lower channels is broken as shown in FIG. 5. This increases the upward force on the gasket from the high pressure fluid in comparison to the sideways force because the high pressure fluid is pushing against the entire bottom surface of the gasket. Since the fluid is still pushing against the entire high pressure side of the gasket, however, the gasket is still driven towards the juncture and the effectiveness of the seal is not reduced.

When too much O-ring is used in a conventional groove without slots so that, as shown in FIG. 3, the gasket contacts both groove side walls at rest, a further problem develops. When the reservoir is filled with high pressure fluid some of the fluid will seep into the lower channels 50, 54 of the groove. When the pressure in the reservoir is relieved, the gasket will regain its seal against the groove side walls trapping high pressure fluid into the lower channels. Even when the reservoir is empty, the trapped fluid still pushes the gasket upward against the sealing surface 38. This increases the friction of the gasket against the upper surface 38 making it very difficult to unscrew the reservoir from the valve body. When, as in the present invention, the groove includes slots in the high pressure side wall which extend below the centerline of the gasket, high pressure fluid cannot be trapped in the lower high pressure side channel. When pressure is released in the reservoir, the gasket pressure also releases. As a result, the reservoir is just as easy to screw off as it is to screw on.

When a slotted groove is applied to the soap dispenser of FIG. 1 and the upstream conduit is coupled to a conventional garden hose, the soap reservoir can be screwed on with only minimal pressure. Although the seal may leak when the water supply is first turned on, after the soap reservoir fills with water, the gasket is urged upwards by the pressure inside the reservoir and the leaking stops. Similarly, when the water is shut off, the pressure in the cavity decreases, the gasket falls away from the sealing surface 38 and leakage may reoccur. As a result of adding the slots, the amount of pressure with which the bottom of the groove must push the gasket against the sealing surface is greatly reduced. It has been found that the same soap dispenser, without any slots requires one quarter to one-half turn past the point of contact between the gasket and the sealing surface to insure an adequate seal against the pressure of a garden hose. By adding slots as in the preferred embodiment, using the same pitch threads and an O-ring with the same cross section, no additional turning past the contact point is required. The tightness of the seal is determined, in part, by the fluid pressure developed within the cavity so the gasket is virtually self-adjusting. As the pressure of the fluid increases, so does the tightness of the seal.

As can be seen in FIG. 2, most of the high pressure side wall 40 is intact and helps hold the gasket in place. While eight slots are presently preferred, an adequate seal has also been obtained using only four slots. High pressure fluid enters the slots, and continues in the space between the high pressure side wall and the gasket to urge the gasket against the side wall along its entire length.

When the present invention is applied to a soap dispenser coupled to a garden hose the pressure within the soap reservoir can range from 200 kPa to over 1040 kPa. The best seal is obtained when the gasket is only minimally pressed against the sealing surface before the garden hose pressure is applied and when the gasket is made from a synthetic polymer rubber with a hardness of 40-70 shore. Different rubber hardnesses may be preferred for different pressure ranges.

While the present invention has been described primarily in the context of an annular groove for a soap reservoir which screws onto a main body, other configurations are possible. Moreover, it is not necessary that the body holding the groove and the body bearing the sealing surface 38 be held together with threads. Any sort of clamp, clip or other latching arrangement can be used. In addition, while the groove and gasket have been depicted as annular, they may take any other shape desired including that of a straight line segment. The operation of the invention does not depend on the shape of the groove or the gasket. The size of the gasket can also be varied with respect to the groove within certain limits. A conventionally sized gasket can benefit from the slots in many of the ways that a gasket that provides too much O-ring as shown in the drawings can. In addition, while the gasket has been shown as having a circular cross section and this shape is presently preferred in order to balance the forces acting on the gasket, a variety of other gasket cross sections are also possible. Finally, the present invention can be used in many other fields and not just for soap dispensers. A variety of devices used for a variety of fluids can be sealed using the present invention. A great variety of other modifications are possible within the scope of the present invention and the applicant intends in no way to abandon these variations and modifications by describing only the embodiments discussed herein.

What is claimed is:

1. A fluid seal comprising:
   a first body having a sealing surface;
   a second body having a groove and connectable to the first body so that the groove faces the sealing surface at a juncture between the two bodies, the groove having a high pressure sidewall and an opposite low pressure sidewall;
   a flexible gasket within the groove for engaging the sealing surface; and
   a slot in the high pressure sidewall at least as deep as one-half the thickness of the gasket for allowing fluid to enter the groove and urge the gasket toward the juncture between the two bodies to provide a fluid tight seal between them.

2. The seal of claim 1 wherein the groove comprises a groove bottom and side walls extending from the groove bottom toward the sealing surface.

3. The seal of claim 1 wherein the slot is as deep as the groove.

4. The seal of claim 1, wherein the groove has a groove bottom and the slot is positioned for the passage of fluid into the slot to the groove bottom.

5. The seal of claim 1 further comprising a reservoir and wherein the groove surrounds the reservoir for containing fluid under pressure, the high pressure wall being between the low pressure wall and the reservoir.

6. The seal of claim 5 wherein the second body includes the reservoir and the first body includes a cap for the reservoir.

7. The seal of claim 5 wherein the groove is annular.

8. The seal of claim 1 wherein the gasket has a cross section wider than that of the groove so that the gasket is deformed in the absence of fluid entering the groove.

9. The seal of claim 8 wherein the slot is adapted to receive a portion of the gasket so that in the absence of pressure at the high pressure sidewall, a portion of the gasket extends into the slot.

10. The seal of claim 9 wherein the portion of the gasket which extends into the slot holds the gasket in place in the groove.

11. The seal of claim 5 wherein the first and second bodies have mating threads and are connectable to each other thereby.

12. The seal of claim 1 wherein the gasket has a circular cross section.

13. A seal comprising:
    a first body having a sealing surface;
    a second body connectable to the first body to define an interior cavity, the second body having a groove facing the sealing surface, the groove defining a closed loop around the interior cavity and having an inner wall on the inside of the loop and an outer wall on the outside of the loop;
    a flexible gasket within the groove having, when at rest, a cross section wider than the cross section of the groove;
    at least one slot through the inner wall at least as deep as one-half the thickness of the gasket connecting the groove with the interior cavity so that fluid under pressure in the cavity urges the gasket into a sealed connection against the sealing surface.

14. The seal of claim 13 wherein the first and second bodies comprise mating threads with which the bodies are connectable.

15. The seal of claim 13 wherein the gasket has a cross section large enough to seal against the outer wall and the sealing surface when urged against the outer wall by fluid under pressure in the cavity.

16. The seal of claim 13 wherein portions of the gasket extend into the slots in the absence of fluid under pressure in the cavity.

17. The seal of claim 13 wherein the interior cavity includes a soap reservoir, and the sealed connection contains the soap in the reservoir.

18. The seal of claim 13 wherein the second body comprises a soap reservoir in the interior cavity, and the first body contains the soap within the reservoir.

19. A fluid dispenser comprising:
    a first body comprising a container having an open ended soap reservoir;
    a second body connectable to the first body to close the soap reservoir at an opening between the bodies, one said body having a groove spaced apart from and surrounding the opening, and the other body having a sealing surface facing the groove when the bodies are connected, the groove having a high pressure sidewall nearest the opening and a low pressure sidewall opposite the high pressure sidewall;
    a flexible gasket in the groove;
    an upstream conduit for conducting fluid at high pressure into the soap reservoir;
    a downstream conduit for conducting fluid out of the soap reservoir; and
    at least one slot in the high pressure sidewall at least as deep as one-half the thickness of the gasket for allowing fluid int he soap reservoir to enter the groove and press the gasket against the sealing surface to seal the opening.

20. The dispenser of claim 19 wherein the groove comprises a groove bottom and the groove side walls extend from the groove bottom towards the sealing surface.

21. The dispenser of claim 15 wherein the groove has a rectangular cross section defined by a bottom and said walls extending therefrom.

22. The dispenser of claim 19 wherein the gasket has a circular cross section.

23. The dispenser of claim 21 wherein the gasket has a circular cross section which in the absence of pressure in the reservoir is wider than the groove cross section.

24. The dispenser of claim 19 wherein the groove is annular.

25. The dispenser of claim 24 wherein the gasket is annular and the inside diameter of the gasket in the absence of pressure in the reservoir is smaller than the inside diameter of the groove.

26. The dispenser of claim 24 wherein the slots are spaced equidistant about the groove's circumference.

27. The dispenser of claim 19 wherein the first and second bodies comprise mating threads with which the bodies are connectable.

28. The dispenser of claim 19 wherein the fluid is water.

29. The dispenser of claim 19 wherein the fluid includes water and soap.

* * * * *